United States Patent
Liang et al.

(10) Patent No.: US 12,103,857 B1
(45) Date of Patent: Oct. 1, 2024

(54) PREPARATION METHOD OF TRANSITION METAL BORIDES

(71) Applicant: KUNMING UNIVERSITY OF SCIENCE AND TECHNOLOGY, Kunming (CN)

(72) Inventors: Feng Liang, Kunming (CN); Junxi Li, Kunming (CN); Da Zhang, Kunming (CN); Zhipeng Xie, Kunming (CN); Wenhui Ma, Kunming (CN); Bin Yang, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 18/303,062

(22) Filed: Apr. 19, 2023

Related U.S. Application Data

(63) Continuation of application No. PCT/CN2023/081231, filed on Mar. 14, 2023.

(51) Int. Cl.
   *C01B 35/04* (2006.01)
(52) U.S. Cl.
   CPC ................. *C01B 35/04* (2013.01)
(58) Field of Classification Search
   None
   See application file for complete search history.

(56) References Cited

U.S. PATENT DOCUMENTS

| | | | |
|---|---|---|---|
| 4,610,718 A * | 9/1986 | Araya | H05H 1/28 75/336 |
| 6,777,639 B2 * | 8/2004 | Schroder | C01B 21/0761 219/121.52 |

OTHER PUBLICATIONS

Keszler, A. M., et al. Optical Emission Spectroscopic Study of the Synthesis of Titanium Boride Nanoparticles in RF Thermal Plasma Reactor. Plasma Chem Plasma Process (2017) 37:1491-1503. (Year: 2017).*
Guo, W., et al. TiB2 Powders Synthesis by Borothermal Reduction in TiO2 Under Vacuum. J. Am. Ceram. Soc. (2014) 97(5):1359-1362. (Year: 2014).*
Watanabe, T., et al. "Formation mechanism of electrically conductive nanoparticles by induction thermal plasmas." Thin Solid Films 435 (2003) 27-32. (Year: 2003).*

* cited by examiner

*Primary Examiner* — Anthony J Zimmer
*Assistant Examiner* — Zachary Jahn Baum
(74) *Attorney, Agent, or Firm* — Daniel M. Cohn; Howard M. Cohn

(57) ABSTRACT

A rapid preparation method of transition metal borides includes steps of: using a tungsten rod as the cathode, and a block mixture of boron powder and metal oxide as the anode, the block mixture and the tungsten rod are placed in an plasma device; the plasma device is evacuated, and then filled with a buffer gas and an electric arc is started to obtain a transition metal boride. The present disclosure adopts the direct current arc plasma method with the advantages of simple operation, low cost, environmental friendliness and controllable reaction atmosphere to prepare the transition metal boride, the preparation process is simple, the preparation process is fast, and the environment will not be affected.

4 Claims, 5 Drawing Sheets

---

Boron powder and metal oxides are mixed through a mortar to obtain a block mixture, the tungsten rod is used as the cathode, and the block mixture is used as the anode, which is placed in the arc plasma device.

The plasma device is pumped to vacuum, then fill the buffer gas and control the plasma device to start the arc, and then control the plasma device to close the arc after the block mixture is ignited, and the block mixture continues to burn and react to obtain transition metal borides.

Boron powder and metal oxides are mixed through a mortar to obtain a block mixture, the tungsten rod is used as the cathode, and the block mixture is used as the anode, which is placed in the arc plasma device.

↓

The plasma device is pumped to vacuum, then fill the buffer gas and control the plasma device to start the arc, and then control the plasma device to close the arc after the block mixture is ignited, and the block mixture continues to burn and react to obtain transition metal borides.

FIG. 1

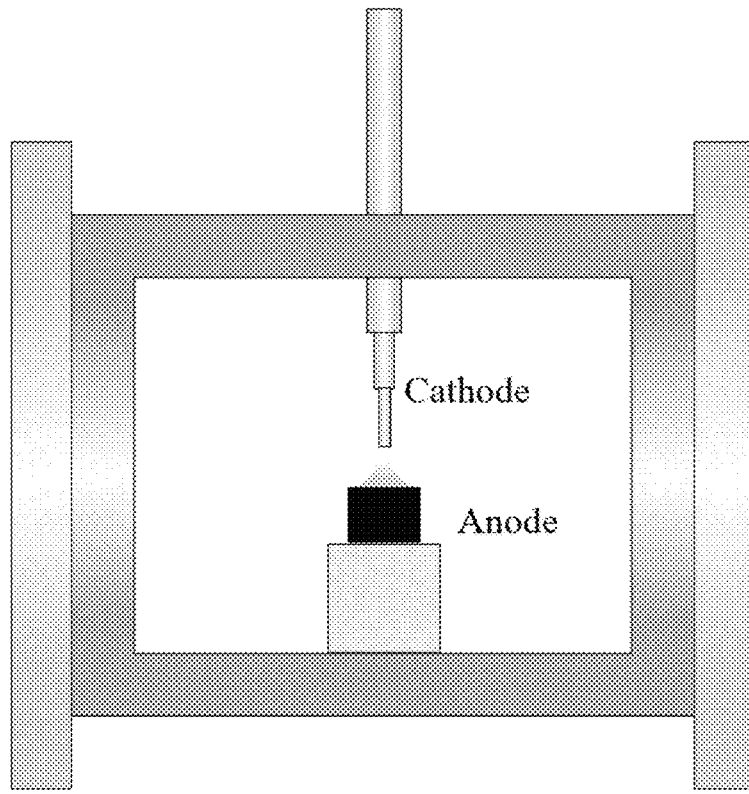

FIG. 2

PREPARATION METHOD OF TRANSITION METAL BORIDES

CROSS-REFERENCE TO RELATED APPLICATIONS

The application is a continuation of International Application No. PCT/CN2023/081231 filed on Mar. 14, 2023.

TECHNICAL FIELD

The present disclosure relates to a rapid preparation method of transition metal borides, and particularly relates to the field of DC arc preparation of nanomaterials.

BACKGROUND

In recent years, transition metal borides (TMBs) have attracted great interest due to their unique mechanical and electrical properties. These compounds are widely used in scramjet engines, rocket propulsion, hypersonic flight, atmospheric reentry, hard coating of electromechanical systems, armor and cutting tools, etc. For example, titanium diboride is one of the emerging engineering ceramic materials, which has the characteristics of high hardness, high elastic modulus, high refining point, good wear resistance, excellent thermal conductivity and electrical conductivity; Baharvandi et al. synthesized $B_4C$—$TiB_2$ multiphase ceramic materials by sintering $B_4C$ and $TiB_2$ as raw materials at 2050/2150° C. without pressure. The addition of $TiB_2$ can reduce porosity and inhibit grain growth. Under the same $TiB_2$ content, the higher the synthesis temperature, the better the density.

The common preparation methods of transition metal borides are the reduction of mixtures of boron halides and metal halides with hydrogen, the reduction of mixtures of diboron trioxide and metal oxides with carbon, the reduction of metal oxides with electrolytic molten salt and elemental boron, etc. Although the above methods have been widely used in the preparation of metal borides, there are some problems, for example, the reduction of the mixture of boron halide and metal halide with hydrogen, putting the mixture of boron halide and volatile metal halide on the metal wire in hydrogen to perform pyrolysis reaction can prepare a small amount of very pure metal boride; a large amount of metal boride can be prepared by reducing the mixture of boron trioxide and metal oxide with carbon. However, due to the different volatility of various oxides at high temperature, it will cause changes in chemical composition, and the product is likely to be polluted by boron or boron carbide and carbon generated during preparation processes. Electrolytic molten salt methods can prepare many metal borides, and some have reached an industrial production level. However, the current efficiency is low, several boride phases may be generated, and the product is difficult to separate purely from the molten salt; and the preparation time of the above-mentioned several methods is very long, and some require additional treatment of impurities generated during the preparation process. These methods all take a long time and require an uninterrupted supply of energy.

Therefore, the prior art still needs to be improved and developed.

BRIEF DESCRIPTION OF DRAWINGS

Therefore, the existing technology still needs to be improved and developed.

FIG. 1 is a flow diagram of a rapid preparation method for transition metal borides according to an embodiment of the present disclosure.

FIG. 2 is a schematic diagram of a plasma device used in the rapid preparation method of transition metal borides of the present disclosure.

DETAILED DESCRIPTION

In view of the deficiencies in the prior art above, the purpose of this application is to provide a rapid preparation method of transition metal borides, aiming at solving the technical problems of complex preparation process and great impact on the environment of existing transition metal borides.

Technical scheme of the present disclosure is as follows:

A rapid preparation method of transition metal boride, includes steps:

a. provide a block mixture of boron powder and metal oxide as the anode, and a tungsten rod (or other conductive rod) as the cathode, and place the block mixture and the tungsten rod in the plasma device;

c. pump the plasma device to vacuum, then fill the buffer gas into the plasma device and control the plasma device to start the arc, and then control the plasma device to close the arc after the block mixture is ignited, and the block mixture continues to burn and react to obtain transition metal borides.

In the above implementation mode, by using the plasma device to provide a heat source, the arc can be closed by igniting one end of the anode, and the reaction proceeds in the form of a combustion wave until the entire anode is completely reacted, The arc plasma method has the advantages of simple operation, low cost, environmental friendliness and controllable reaction atmosphere, and the arc plasma method can rapidly prepare the transition metal boride, which has a simple preparation process, and does not affect the environment.

Optionally, the buffer gas is argon.

Optionally, the metal oxide is one of $Co_3O_4$, $Fe_3O_4$, NiO, $TiO_2$ or $V_2O_5$.

Optionally, the distance between the block mixture and the tungsten rod in the plasma device is 1-3 mm.

Optionally, the discharge current of the arc is 12-50 A, and the discharge time is 1-30 s.

Optionally, the vacuum degree of the plasma device after vacuuming is less than or equal to 3 Pa.

Optionally, the gas pressure after the buffer gas is charged is 40-80 kPa.

It can be understood that the distance range between the above-mentioned block mixture and the tungsten rod, and the gas pressure range in the plasma device can make the arc more stable; the arc discharge current and discharge time cooperate with the above-mentioned distance range and pressure range. Excellent transition metal borides can be prepared.

EXAMPLES

Example 1

Preparation of discharge anode: Mix boron powder and nickelic oxide powder with a molar ratio of 6:1 through a mortar and put them into a mold, and perform cold isostatic pressing at a pressure of 2 MPa and holding the pressure for 30 s to obtain mixture block;

The tungsten rod was used as the cathode and the block mixture as the anode, with a space of 1 mm between the cathode and the anode, and perform plasma treatment in a 50 kPa Ar atmosphere. The working current is 12 A. The discharge time is 10 s. Finally, the resulting nickel boride (NiB) is collected on the inner wall of the reaction cavity.

Figure 3:
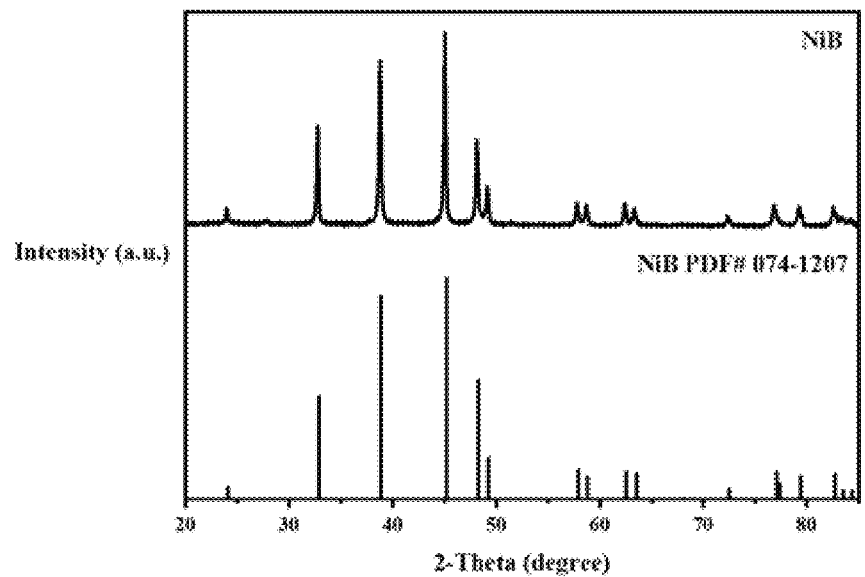
FIG. 3 is an X-ray diffraction (XRD) image of nickel boride nanoparticles prepared in example 1.
Figure 4:
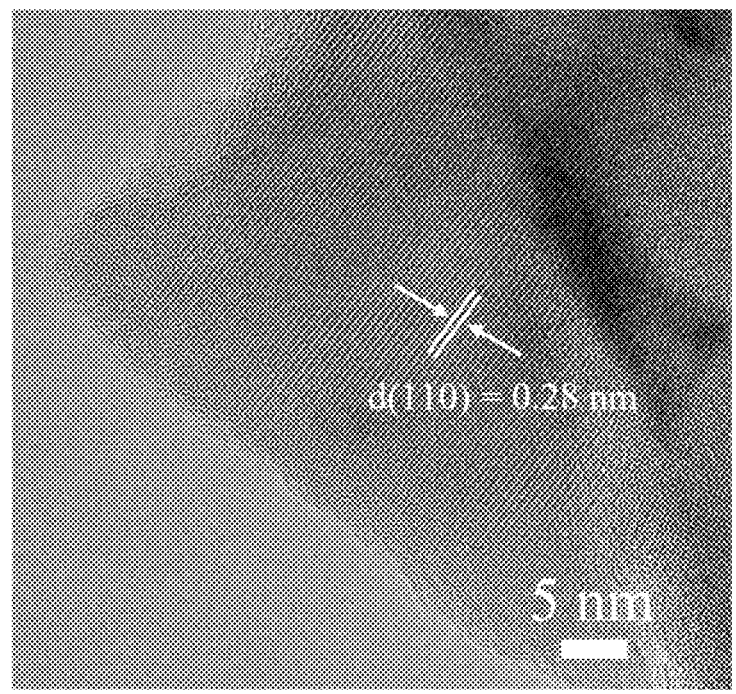
FIG. 4 is a transmission electron microscope (TEM) image of nickel boride nanoparticles prepared in example 1.

The characterization of the NiB: characterizing by XRD in FIG. 3, it is found that diffraction peak of the NiB is basically consistent with the standard spectrum below, that is to say, the high Pure NiB particles can be prepared through the DC arc discharge method of Example 1. FIG. 4 provides a transmission electron microscopy (TEM) image of the NiB at a scale bar of 5 nm, and it is measured that the planar distance d of the NiB particles is 0.28 nm, and this value corresponds to the (110) crystal plane of the NiB structure, indicating that NiB was successfully prepared.

Example 2

Preparation of discharge anode: Mix boron powder and vanadium pentoxide powder with a molar ratio of 8:1 through a mortar and put them into a mold, and perform cold isostatic pressing at a pressure of 2 MPa and holding the pressure for 30 s to obtain a mixture block;

The tungsten rod was used as the cathode and the block mixture as the anode, with a space of 1 mm between the cathode and the anode, and perform plasma treatment in a 50 kPa Ar atmosphere. The working current is 20 A. The discharge time is 10 s. Finally, the resulting vanadium diboride ($VB_2$) is collected on the inner wall of the reaction cavity.

Figure 5:
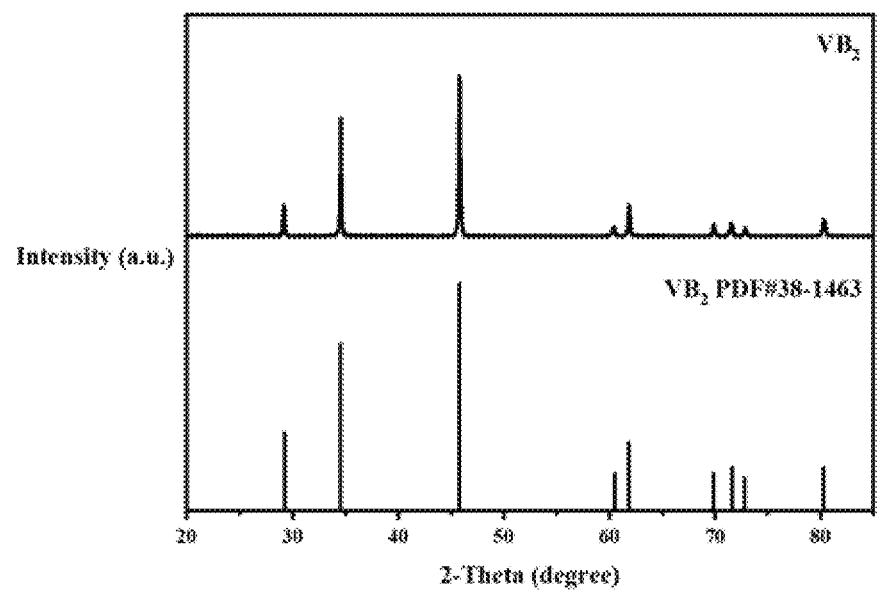
FIG. 5 is an X-ray diffraction (XRD) image of vanadium diboride nanoparticles prepared in example 2.
Figure 6:
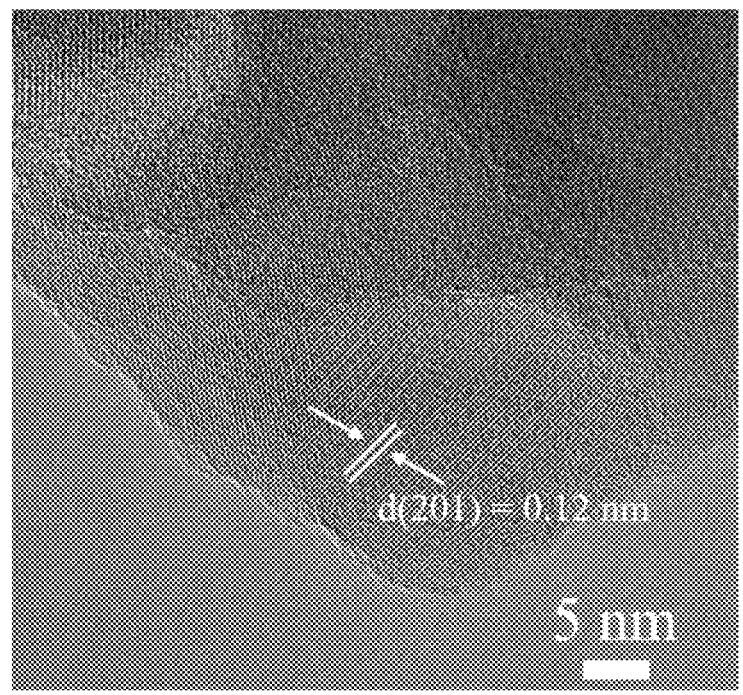
FIG. 6 is a transmission electron microscope (TEM) image of vanadium diboride nanoparticles prepared in example 2.

The characterization of the $VB_2$: characterizing by XRD in FIG. 5 it is found that diffraction peak of the $VB_2$ is basically consistent with the standard spectrum below, that is to say, the high Pure $VB_2$ particles can be prepared through the DC arc discharge method of Example 2. FIG. 6 provides a transmission electron microscopy (TEM) image of the $VB_2$ at a scale bar of 5 nm, and it is measured that the planar distance d of $VB_2$ particles is 0.12 nm, and this value corresponds to the (201) crystal plane of the $VB_2$ structure, indicating that $VB_2$ was successfully prepared.

Example 3

Preparation of discharge anode: Mix boron powder and titanium dioxide powder with a molar ratio of 4:1 through a mortar and put them into a mold, and perform cold isostatic pressing at a pressure of 2 MPa and holding the pressure for 30 s to obtain mixture block;

The tungsten rod was used as the cathode and the block mixture as the anode, with a space of 1 mm between the cathode and the anode, and perform plasma treatment in a 40 kPa Ar atmosphere. The working current is 50 A. The discharge time is 5 s. Finally, the resulting titanium diboride ($TiB_2$) is collected on the inner wall of the reaction cavity.

Figure 7:
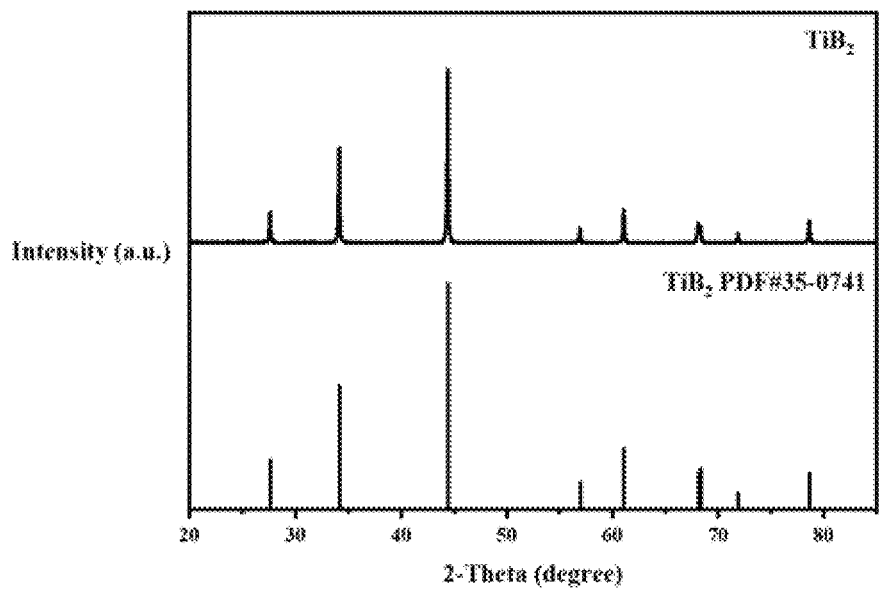
FIG. 7 is an X-ray diffraction (XRD) image of titanium diboride nanoparticles prepared in example 3.
Figure 8:
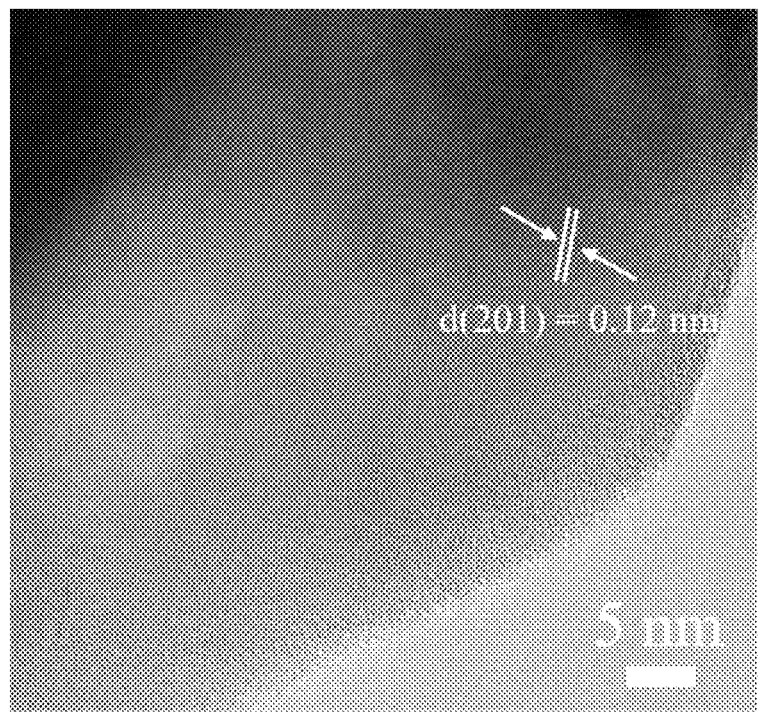
FIG. 8 is a transmission electron microscope (TEM) image of titanium diboride nanoparticles prepared in example 3.

The characterization of the $TiB_2$: by characterizing by XRD in FIG. 7, it is found that diffraction peak of the $TiB_2$ is basically consistent with the standard spectrum below, that is to say, the high Pure $TiB_2$ particles can be prepared through the DC arc discharge method of Example 3. FIG. 8 provides a transmission electron microscopy (TEM) image of the $TiB_2$ at a scale bar of 5 nm, and it is measured that the planar distance d of $TiB_2$ particles is 0.12 nm, and this value corresponds to the (201) crystal plane of the $TiB_2$ structure, indicating that $TiB_2$ was successfully prepared.

Example 4

Preparation of discharge anode: Mix boron powder and cobaltosic oxide powder with a molar ratio of 10:1 through a mortar and put them into a mold, and perform cold isostatic pressing at a pressure of 2 MPa and holding the pressure for 30 s to obtain mixture block;

The tungsten rod was used as the cathode and the block mixture as the anode, with a space of 1 mm between the cathode and the anode, and perform plasma treatment in a 70 kPa Ar atmosphere. The working current is 12 A. The discharge time is 30 s. Finally, the resulting cobalt boride (CoB) is collected on the inner wall of the reaction cavity.

Figure 9:
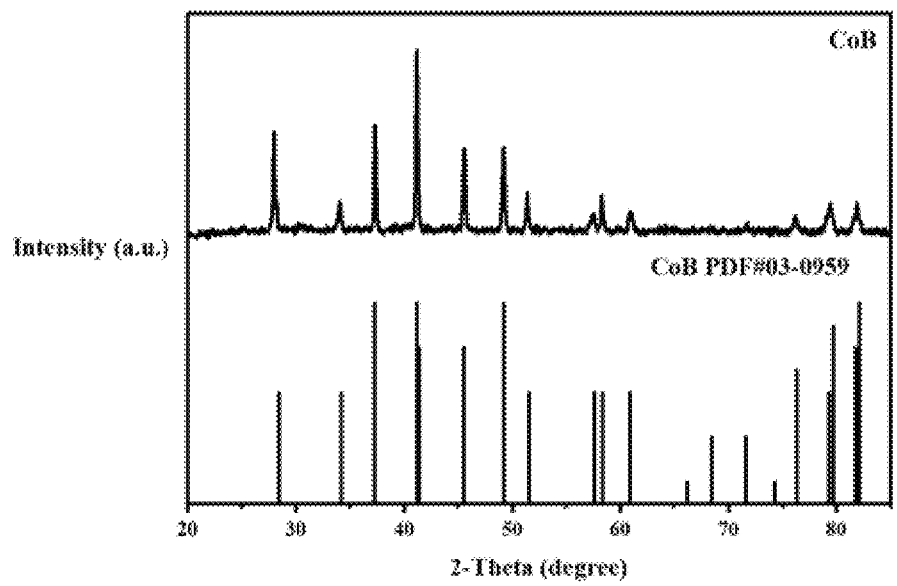
FIG. 9 is an X-ray diffraction (XRD) image of cobalt boride nanoparticles prepared in example 4.
Figure 10:
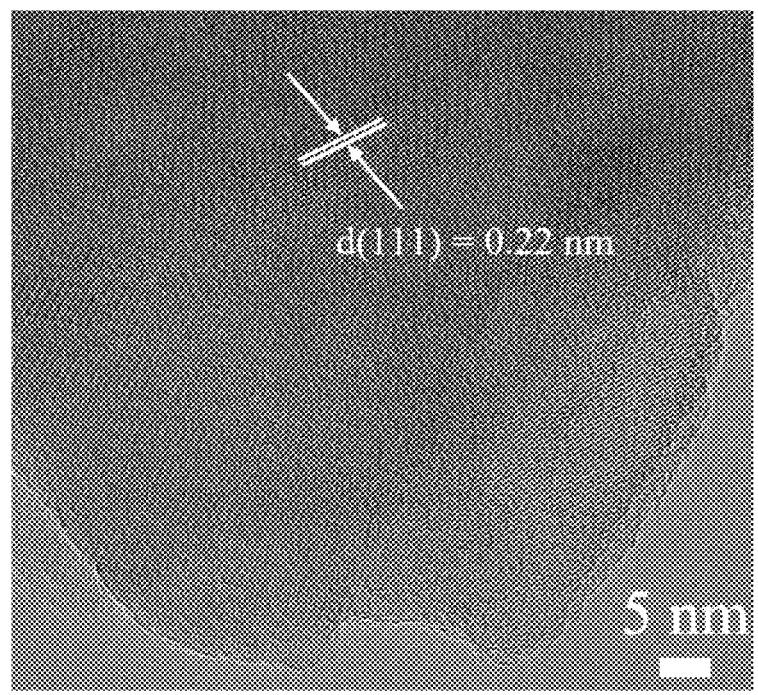
FIG. 10 is a transmission electron microscope (TEM) image of cobalt boride nanoparticles prepared in example 4.

The characterization of the CoB: by characterizing by XRD in FIG. 9, it is found that diffraction peak of the CoB is basically consistent with the standard spectrum below, that is to say, the high Pure CoB particles can be prepared through the DC arc discharge method of Example 4. FIG. 10 provides a transmission electron microscopy (TEM) image of the CoB at a scale bar of 5 nm, and it is measured that the planar distance d of CoB particles is 0.22 nm, and this value corresponds to the (111) crystal plane of the CoB structure, indicating that CoB was successfully prepared.

What is claimed is:

1. A preparation method of transition metal borides comprising:
   mixing boron powder and metal oxide powder with a preset molar ratio to obtain a block mixture;
   placing the block mixture and a tungsten rod in a plasma device, wherein the block mixture is used as anode and the tungsten rod is used as cathode; and
   vacuumizing the plasma device, and filling a buffer gas into the plasma device, controlling the plasma device to start an arc to ignite the block mixture, controlling the plasma device to close the arc when the block mixture has been ignited, and the block mixture continues to burn and react to obtain transition metal borides when the arc is closed,
   wherein the metal oxide is nickel oxide; the preset molar ratio is 6:1; a space between the block mixture and the tungsten rod in the plasma device is 1 mm; a discharge current of the arc is 12 A and a discharge time is 1 s; a vacuum degree of the plasma device after the vacuumizing is less than or equal to 3 Pa; the buffer gas is argon gas; and the argon gas pressure is 70 kPa.

2. A preparation method of transition metal borides comprising:
   mixing boron powder and metal oxide powder with a preset molar ratio to obtain a block mixture;

placing the block mixture and a tungsten rod in a plasma device, wherein the block mixture is used as anode and the tungsten rod is used as cathode; and vacuumizing the plasma device, and filling a buffer gas into the plasma device, controlling the plasma device to start an arc to ignite the block mixture, controlling the plasma device to close the arc when the block mixture has been ignited, and the block mixture continues to burn and react to obtain transition metal borides when the arc is closed, wherein the metal oxide is vanadium dioxide; the preset molar ratio is 8:1; a space between the block mixture and the tungsten rod in the plasma device is 2 mm; a discharge current of the arc is 20 A and a discharge time is 10 s; a vacuum degree of the plasma device after the vacuumizing is less than or equal to 2 Pa; the buffer gas is argon gas; and the argon gas pressure is 80 kPa.

3. The method of claim 1, A preparation method of transition metal borides comprising:

mixing boron powder and metal oxide powder with a preset molar ratio to obtain a block mixture;

placing the block mixture and a tungsten rod in a plasma device, wherein the block mixture is used as anode and the tungsten rod is used as cathode; and vacuumizing the plasma device, and filling a buffer gas into the plasma device, controlling the plasma device to start an arc to ignite the block mixture, controlling the plasma device to close the arc when the block mixture has been ignited, and the block mixture continues to burn and react to obtain transition metal borides when the arc is closed, wherein the metal oxide is cobalt tetroxide; the preset molar ratio is 10:1; a space between the block mixture and the tungsten rod in the plasma device is 3 mm; a discharge current of the arc is 12 A and a discharge time is 30 s; a vacuum degree of the plasma device after the vacuumizing is less than or equal to 3 Pa; the buffer gas is argon gas, and the argon gas pressure is 70 kPa.

4. The method of claim 1, A preparation method of transition metal borides comprising:

mixing boron powder and metal oxide powder with a preset molar ratio to obtain a block mixture;

placing the block mixture and a tungsten rod in a plasma device, wherein the block mixture is used as anode and the tungsten rod is used as cathode; and vacuumizing the plasma device, and filling a buffer gas into the plasma device, controlling the plasma device to start an arc to ignite the block mixture, controlling the plasma device to close the arc when the block mixture has been ignited, and the block mixture continues to burn and react to obtain transition metal borides when the arc is closed, wherein the metal oxide is ferric tetroxide; the preset molar ratio is 10:1; a space between the block mixture and the tungsten rod in the plasma device is 1 mm; a discharge current of the arc is 12 A and a discharge time is 5 s; a vacuum degree of the plasma device after the vacuumizing is less than or equal to 3 Pa; the buffer gas is argon gas; and the argon gas pressure is 70 kPa.

\* \* \* \* \*